United States Patent
Su et al.

(10) Patent No.: US 11,093,053 B2
(45) Date of Patent: Aug. 17, 2021

(54) INPUT DEVICE

(71) Applicant: Logitech Europe S.A., Lausanne (CH)

(72) Inventors: Chun-Wei Su, Hsinchu (TW);
Kuan-Lin Wu, Hsinchu (TW); Laurent Mealares, Hsinchu (TW); Thibaut Mauron, Hsinchu (TW); Chia Feng Lee, Taichung (TW); Christina Chen, Hsinchu (TW); Alice Liu, Hsinchu (TW); Chih-Wei Chen, Morges (CH); Kuo Hsiang Chen, Miaoli County (TW); Joe Chiu, Hsinchu (TW); Charles Gigandet, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/681,269

(22) Filed: Nov. 12, 2019

(65) Prior Publication Data

US 2020/0150788 A1    May 14, 2020

Related U.S. Application Data

(63) Continuation of application No. 15/829,291, filed on Dec. 1, 2017, now Pat. No. 10,514,780.

(51) Int. Cl.
*G06F 3/033*      (2013.01)
*G06F 3/0354*    (2013.01)
(Continued)

(52) U.S. Cl.
CPC ........ *G06F 3/03544* (2013.01); *G06F 1/3215* (2013.01); *G06F 3/016* (2013.01);
(Continued)

(58) Field of Classification Search
CPC ............ G06F 3/03543; G06F 3/03544; G06F 1/3215; G06F 3/016; G06F 3/0308;
(Continued)

(56) References Cited

U.S. PATENT DOCUMENTS 7,092,785 B2    8/2006   Alsio et al.
8,698,746 B1    4/2014   Merrick
(Continued)

OTHER PUBLICATIONS

Non-Final Office Action for U.S. Appl. No. 15/829,291 dated Jan. 10, 2019, 170 pages.
(Continued)

*Primary Examiner* — Abdul-Samad A Adediran
(74) *Attorney, Agent, or Firm* — Kilpatrick Townsend & Stockton LLP

(57) ABSTRACT

In some embodiments, an input device includes a housing having a top surface, a touch sensor disposed on the top surface of the housing, and a processor disposed in the housing. The touch sensor can be configured to detect a contact by a hand on the top surface of the housing and generate touch data corresponding to the detected contact by the hand. The processor can be configured to control operation of the touch sensor and receive the touch data, determine an orientation of the hand with respect to the housing based on the touch data, and calibrate a detected movement of the input device based on the determined orientation of the hand with respect to the housing. An image sensor and/or one or more IMUs can be used to detect 2D and/or 3D movement of the input device.

20 Claims, 10 Drawing Sheets

(51) Int. Cl.
*G06F 3/0346* (2013.01)
*G06F 3/01* (2006.01)
*G06F 3/03* (2006.01)
*G06F 1/3215* (2019.01)
*G06F 3/038* (2013.01)

(52) U.S. Cl.
CPC .......... *G06F 3/0308* (2013.01); *G06F 3/0317* (2013.01); *G06F 3/0346* (2013.01); *G06F 3/0383* (2013.01); *G06F 3/03543* (2013.01); *G06F 2203/0333* (2013.01)

(58) Field of Classification Search
CPC .... G06F 3/0317; G06F 3/0346; G06F 3/0383; G06F 2203/0333
USPC ........................................................ 345/158
See application file for complete search history.

(56) References Cited

U.S. PATENT DOCUMENTS

| | | |
|---|---|---|
| 10,514,780 B2 | 12/2019 | Su et al. |
| 2007/0152966 A1 | 7/2007 | Krah et al. |
| 2011/0199301 A1* | 8/2011 | Zhao .................. G06F 3/03543 |
| | | 345/158 |
| 2015/0022446 A1 | 1/2015 | Asplund |
| 2016/0364020 A1* | 12/2016 | Deng .................. G06F 3/03543 |
| 2017/0220139 A1 | 8/2017 | Forde et al. |
| 2018/0335843 A1 | 11/2018 | Erivantcev et al. |

OTHER PUBLICATIONS

Final Office Action for U.S. Appl. No. 15/829,291 dated May 3, 2019, 171 pages.
Notice of Allowance for U.S. Appl. No. 15/829,291 dated Aug. 12, 2019, 8 pages.

* cited by examiner

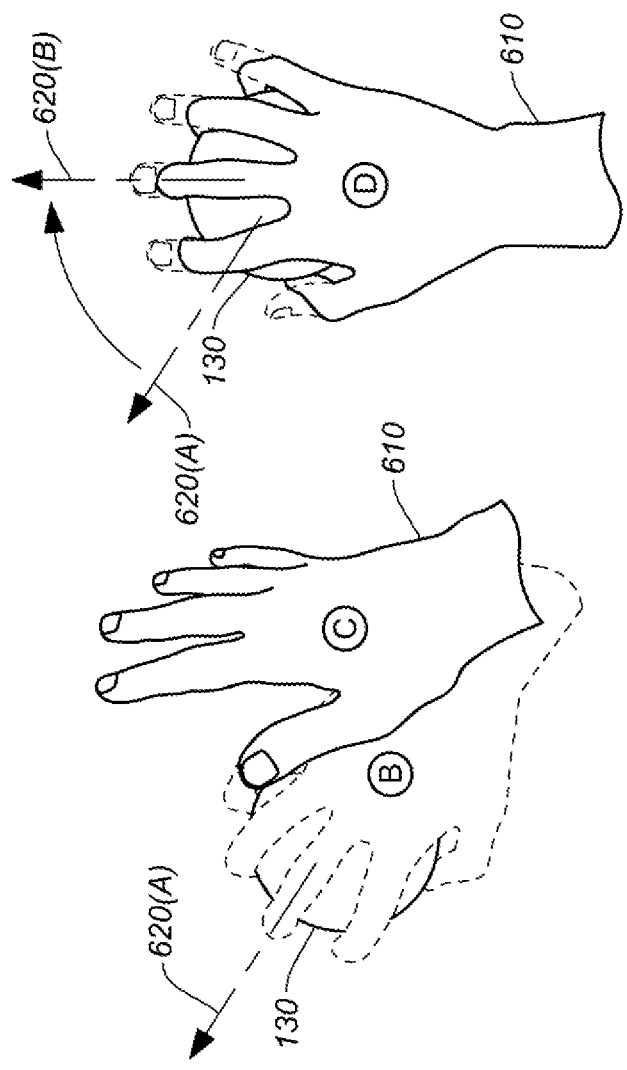
FIG. 6C
FIG. 6B
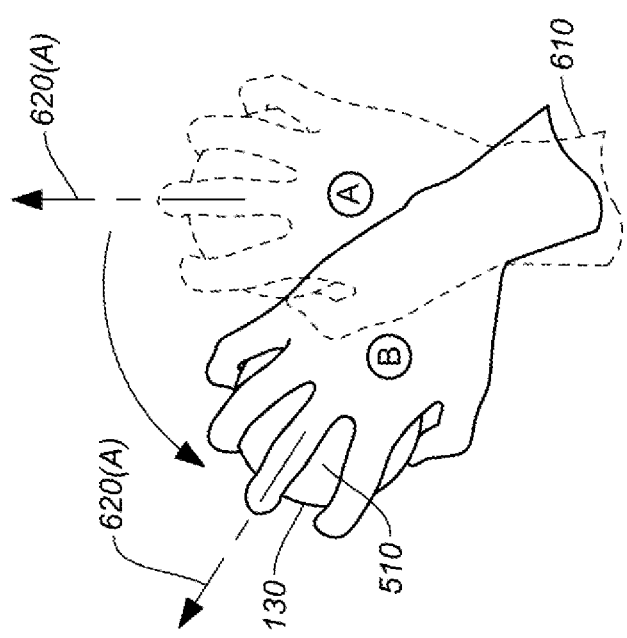
FIG. 6A

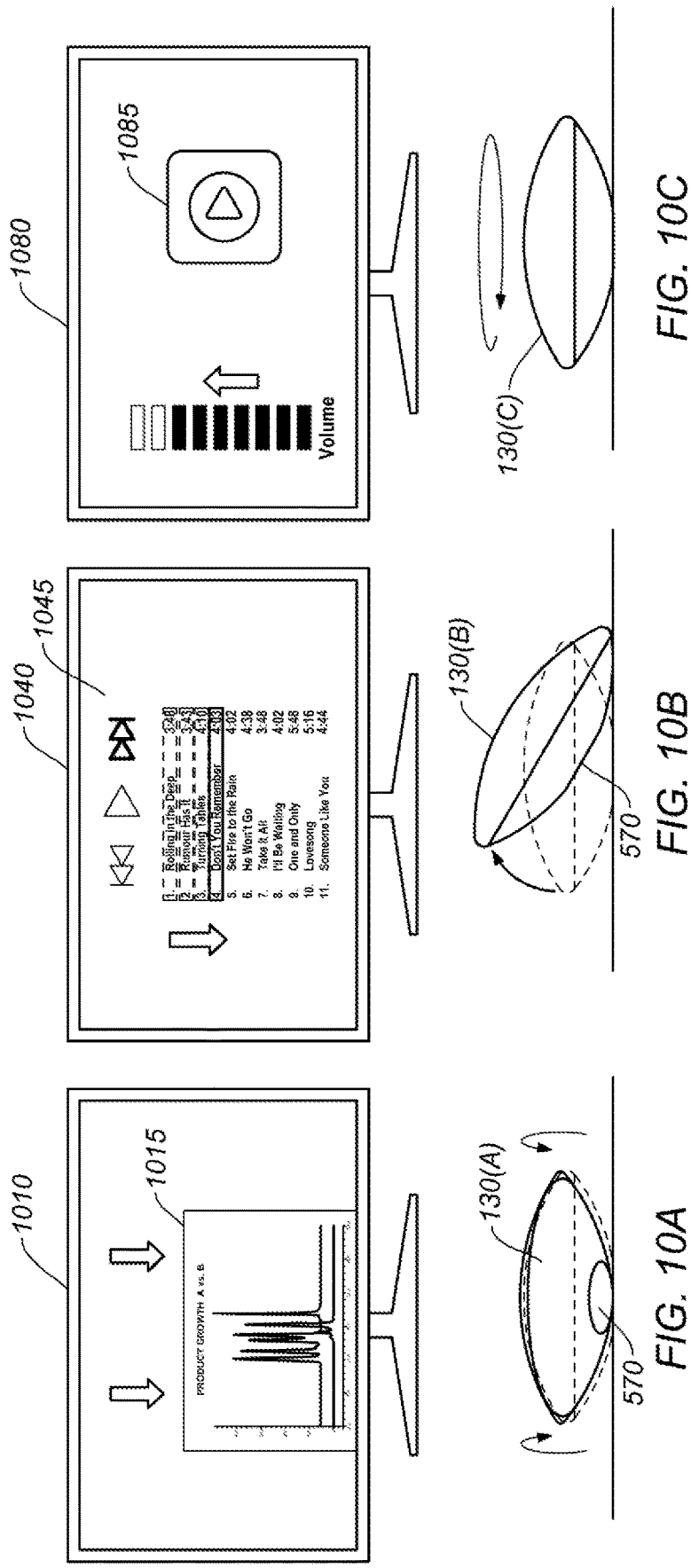

INPUT DEVICE

CROSS-REFERENCES TO RELATED APPLICATIONS

This application is continuation of U.S. Non-Provisional application Ser. No. 15/829,291, filed on Dec. 1, 2017, and titled "INPUT DEVICE," which is hereby incorporated by reference in its entirety for all purposes.

BACKGROUND

Input devices are commonplace in contemporary computing systems and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality (VR) and/or augmented reality (AR) controllers and head-mounted displays, touch pads, remote controls, gaming controllers, joysticks, trackballs, and the like. Some non-limiting examples of computing systems include desktops, laptops, tablet computers, smart phones, personal digital assistants, wearable devices (e.g., smart watches, glasses), VR and/or AR systems, and the like.

VR may be referred to as immersive multimedia or computer-simulated reality. It is frequently associated with a variety of applications, which may comprise immersive, highly visual, computer-simulated environments. These environments typically simulate a physical presence of a user in places in the real world or imagined worlds. The computer simulation of these environments is commonly achieved by visual images and auditory signals.

Visual images are commonly presented by means of a video display that forms part of a head mounted display (HMD) and may encompass all or part of a user's field of view. The HMD may be arranged as a visor, helmet or other suitable configuration. Some examples of HMDs that are presently available are the Oculus Rift, HTC Vive, Samsung Gear VR, and Microsoft HoloLens.

Input devices such as computer mice are conventionally used to control a cursor on a display by tracking a movement of the computer mouse relative to an underlying surface. Computer mice typically include a number of interface elements including buttons, scroll wheels, touch sensitive regions, and the like. While computer mice can be particularly effective for tracking movement along a two-dimensional ("2D") surface, they are not conventionally well-suited for in-air movements, particularly three-dimensional ("3D") environments in VR applications. Even some contemporary computer mice that incorporate inertial measurement units (IMUs) tend to be bulky, cumbersome, awkward, and can have a limited scope of use in VR applications.

Some presenter devices (e.g., "clickers") may be well-suited for limited in-air use (e.g., advancing slides in a presentation), but not necessarily in fully immersive 3D environments. VR controllers, on the other hand, can be typically well-suited for VR environments, but highly inefficient or ineffective for generating input commands beyond simple cursor movements that are typically associated with conventional computer mice (e.g., office applications). While some cross-application input devices exist, better implementations are needed.

BRIEF SUMMARY

According to certain embodiments, an input device can include a housing having a top surface; a touch sensor coupled to the top surface of the housing, the touch sensor configured to: detect a contact by at least a portion of a hand on the top surface of the housing; and generate touch data corresponding to the detected contact by the at least a portion of a hand; and one or more processors disposed in the housing, the one or more processors configured to: receive the touch data from the touch sensor; determine an orientation of the hand with respect to the housing based on the touch data; and calibrate a movement of the input device based on the determined orientation of the hand with respect to the housing. The input device can further include an image sensor coupled to the housing and the processor, the image sensor configured to image a surface, where the one or more processors are configured to determine, based on the image sensor imaging the surface, two-dimensional (2D) movement of the input device with respect to the surface; and where the 2D movement is calibrated based on the determined orientation of the hand with respect to the housing.

Some embodiments may include an inertial measurement unit (IMU) disposed to the housing and the one or more processors, the IMU configured to detect a change in a property indicative of a three-dimensional (3D) movement of the input device; and generate 3D movement data corresponding to the detected change in the property, where the movement of the input device that is calibrated is based, at least in part, on the 3D movement data. The one or more processors may determine a location of at least one finger of the hand on the housing based on the touch data, and the one or more processors can calibrate the movement of the input device based on the location of the at least one finger with respect to the housing. In some cases, the one or more processors may determine a location of a palm of the hand on the housing and at least one finger of the hand on the housing based on the touch data, and the one or more processors can calibrate the movement of the input device based on the location of the palm and the at least one finger with respect to the housing.

In certain embodiments, at least a portion of the top surface of the housing is transparent to IR light, and wherein the input device further comprises: one or more infra-red (IR) emitters controlled by the one or more processors and disposed within the housing, the one or more IR emitters configured to emit IR light out through the IR transparent portion of the top surface of the housing; and one or more IR detectors coupled to the one or more processors and disposed within the housing, the one or more IR detectors configured to detect IR light emitted by IR emitters and reflected off of a hand on the surface of the housing, and wherein the IR emitters are disposed in the housing, where the one or more processors are configured to determine the orientation of the hand with respect to the housing based on the detected IR light. In some aspects, the input device can further include a haptic element coupled to the housing and controlled by the one or more processors, and an inertial measurement unit (IMU) disposed in the housing and coupled to the one or more processors, the IMU configured to: detect a rotation or a tilting of the input device; and generate tilt data corresponding to the detected tilting of the input device or generate rotation data corresponding to the detected rotation of the input device, where the one or more processors are configured to cause the haptic element to generate a stimulus in response to receiving the tilt data or the rotation data, and where an intensity of the stimulus corresponds to an amount of detected tilting or rotation of the input device.

In further embodiments, a method can include receiving, by one or more processors, touch data from a touch sensor disposed on a housing of an input device, the touch data corresponding to a detected presence of a hand on a surface of the housing; determining, by the one or more processors, an orientation of the hand with respect to the housing based on the touch data; calibrating, by the one or more processors, a movement detection of the input device based on the determined orientation of the hand with respect to the housing; receiving, by the one or more processors, movement data from a movement sensor disposed in the housing of the input device, the movement data corresponding to a detected movement of the input device; and determining, by the one or more processors, a movement of the input device based on the movement data, where the determined movement is adjusted as defined by the calibrated movement detection. The movement sensor may be an optical sensor configured to detect a 2D movement of the input device relative to an underlying surface and/or an IMU configured to detect 3D movement of the input device.

In some embodiments, determining the orientation of the hand with respect to the housing can further include determining a location of a middle finger of the hand, and where calibrating the movement detection of the input device is further based on the location of the middle finger with respect to the housing. In some aspects, determining the orientation of the hand with respect to the housing can further include determining a location of a palm of the hand, where calibrating the determine movement of the input device can be further based on the location of the palm of the hand with respect to the housing.

In certain embodiments, the method can include receiving, by the one or more processors, IR data from one or more IR detectors disposed in the housing and controlled by the one or more processors, where the one or more IR detectors are configured to detect IR light emitted by IR emitters and reflected off of a hand on the surface of the housing, and where the IR emitters are disposed in the housing; detecting, by the one or more processors, a location of the hand on the surface of the housing based on the IR data, where determining the orientation of the hand with respect to the housing is further based on detected position of the hand based on the IR data. In some implementations, the movement sensor may include an IMU disposed in the housing and controlled by the one or more processors, the IMU being configured to detect a 3D movement of the input device, where the method further includes: detecting, by the one or more processors, a tilt condition based on the movement data, the tilt condition corresponding to the input device tilting beyond a threshold angle relative to a horizontal plane; causing a haptic device coupled to the input device to generate a stimulus in response to the processor detecting the tilt condition; and modifying an intensity of the stimulus based on an amount of detected tilting of the input device.

In some embodiments, a system includes one or more processors; and one or more non-transitory computer-readable storage mediums containing instructions to cause the one or more processors to perform operations including: receiving touch data from a touch sensor disposed on a housing of an input device, the touch data corresponding to a detected presence of a hand on a surface of the housing; determining an orientation of the hand with respect to the housing based on the touch data; calibrating a movement detection of the input device based on the determined orientation of the hand with respect to the housing; receiving movement data from a movement sensor disposed in the housing of the input device, the movement data corresponding to a detected movement of the input device; and determining a movement of the input device based on the movement data, wherein the determined movement is adjusted as defined by the calibrated movement detection. In some aspects, the movement sensor can be an optical sensor configured to detect a 2D movement of the input device relative to an underlying surface and/or an IMU configured to detect 3D movement of the input device.

In some embodiments, determining the orientation of the hand with respect to the housing can further include determining the location of a middle finger, and calibrating the determine movement of the input device may be further based on the location of the middle finger with respect to the housing. In some cases, determining the orientation of the hand with respect to the housing further includes determining the location of a palm of the hand, and calibrating the determine movement of the input device can be further based on the location of the palm of the hand with respect to the housing.

In certain embodiments, the one or more non-transitory computer-readable storage mediums can further contain instructions to cause the one or more processors to perform operations including: receiving IR data from one or more IR detectors disposed in the housing, wherein the one or more IR detectors are configured to receive reflected IR light emitted by IR emitters and reflected off of a hand on the surface of the housing, and wherein the IR emitters are disposed in the housing; and detecting a position of the hand on the surface of the housing based on the IR data, where the determining the orientation of the hand with respect to the housing is further based on detected position of the hand based on the IR data.

BRIEF DESCRIPTION OF THE DRAWINGS

The detailed description is set forth with reference to the accompanying figures.

FIG. 6A shows aspects of a movement calibration process for an input device using touch detection, according to certain embodiments.

FIG. 6B shows aspects of a movement calibration process for an input device using touch detection, according to certain embodiments.

FIG. 6C shows aspects of a movement calibration process for an input device using touch detection, according to certain embodiments.

FIG. 10A shows a tilt function on an input device, according to certain embodiments.

FIG. 10B shows a second tilt function on an input device, according to certain embodiments.

FIG. 10C shows a rotation function on an input device, according to certain embodiments.

DETAILED DESCRIPTION

Figure 1:
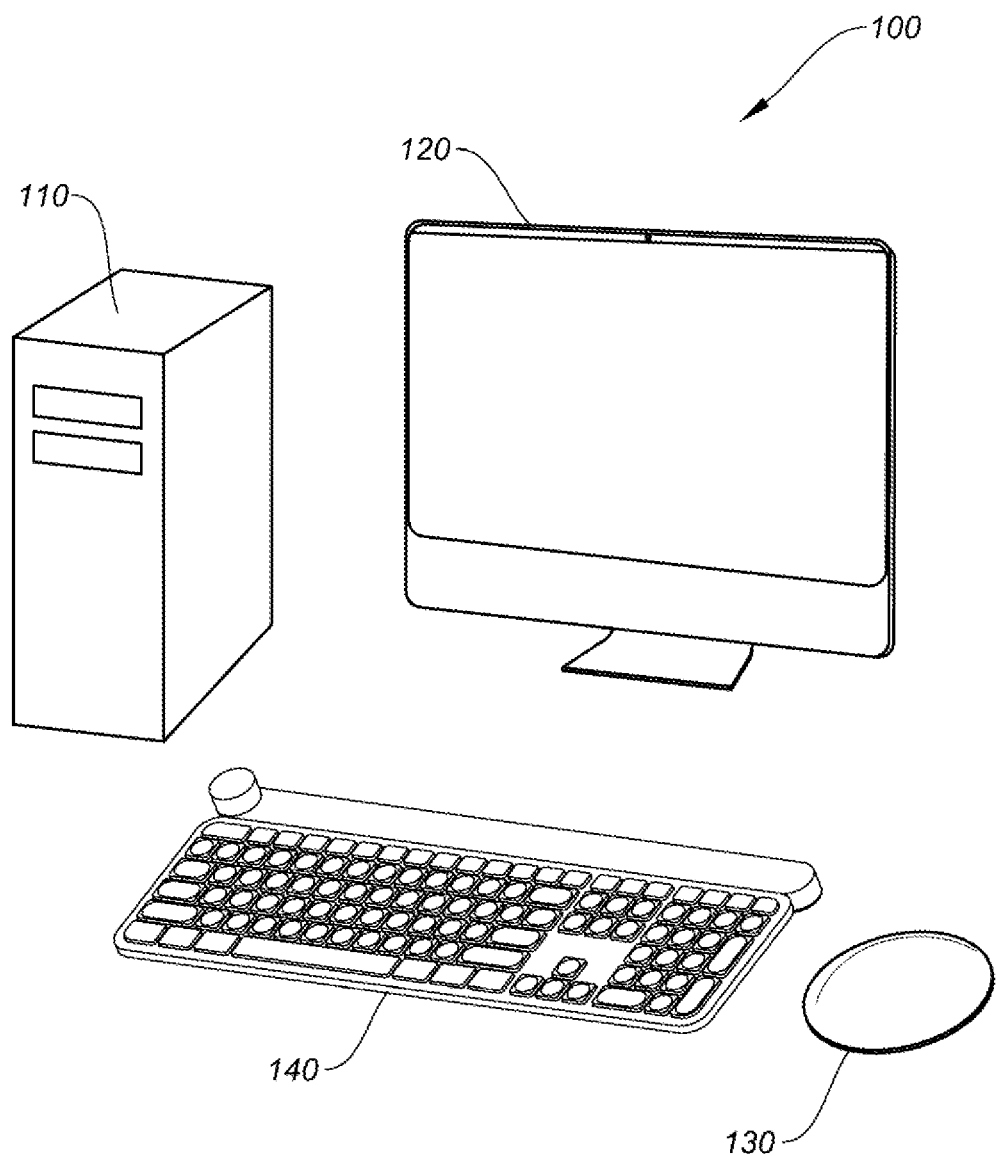
FIG. 1 shows a simplified diagram of a computer system including an input device operating on a surface, according to certain embodiments.

Embodiments of this invention are generally directed to electronic peripheral devices. More specifically, some embodiments relate to an input device that can calibrate a detected movement based on a detected orientation of a user's hand relative to the input device.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

Certain embodiments of the invention relate to an adaptable input device that can be useful and effective over many different modes of operation including 2D movement tracking along an underlying surface (e.g., like some computer mice) and 3D movement tracking for detecting tilting and/or rotation, "in-air" movements (e.g., like some presenter devices), and use in VR/AR environments, as further described below. Conventional computer mice may be well-suited for surface use, but can be awkward, cumbersome, and limited in application for in-air uses including presenter and VR/AR implementations. Furthermore, a user typically cannot physically see an input device when fully immersed in a VR environment and, in some cases, the user may not know if the input device in being held in a "forward" orientation, or if what the user believes to be a forward orientation is actually skewed in another direction. Thus, some aspects of the invention can auto-align to a user's hand by detecting how the input device is being interfaced (e.g., held) by a user, determining an orientation of the hand relative to a housing of the input device (e.g., typically based on a detected location of a middle finger, palm, or combination thereof), and automatically and seamlessly calibrating a movement of the input device (e.g., computer mouse) relative to the detected location of the user's finger and/or palm. This capability can enable embodiments of the invention to receive a user's hand in any orientation (versus conventional mice that may be designed to be operated with respect to one particular orientation) and calibrate the input device's operation to the user's particular grip, making for a highly adaptive interface that can be well-suited for surface use, in-air use, and VR use alike.

Some implementations can utilize a symmetrical design, such as a pill shape, a saucer shape, disc shape, puck shape, spherical shape, or other suitable form factor to allow a user to comfortably interface (e.g., grip) the input device in multiple orientations and to facilitate certain operations such as tilting and rotation functions. Some of the methods of detection described herein include capacitance-based detection schemes (see, e.g., FIG. 5A) and optical (e.g., infra-red) detection schemes (see, e.g., FIG. 6), however other methods of detection (e.g., resistance-based detection schemes) are possible. Some embodiments can incorporate haptic feedback that may change in intensity based on a certain amount of tilt of the input device on a surface, a rotation of the input device, or other suitable function (e.g., 2D or 3D movement speed) that may benefit from haptic integration. It should be noted that the aforementioned examples are non-limiting and broadly illustrate only some of the inventive concepts that are enabled and described in the present disclosure.

In some particular embodiments, an input device can include a housing having a top surface, a touch sensor configured to detect a user interfacing with a surface of the housing, and a processor disposed in the housing. The touch sensor can be configured to detect a contact by a hand on the top surface of the housing and generate touch data corresponding to the detected contact by the hand. The processor can be configured to control the operation of the touch sensor and receive the touch data, determine an orientation of the hand with respect to the housing based on the touch data, and calibrate a detected movement of the input device based on the determined orientation of the hand with respect to the housing. In some aspects, the determined orientation can be based on a detected location of the user's middle finger, palm, or combination thereof. A top surface of the housing can be infra-red (IR) transparent such that IR emitter(s) and detectors placed inside the housing can be used to alternatively or additionally detect the orientation of the user's hand via IR optical detection.

Some embodiments can detect 2D movement along an underlying surface, 3D movement including tilting and/or rotation of an input device relative to a surface, and/or 3 "in-air" usage. An inertial measurement unit (IMU) can be configured to detect a rotation or a tilting of the input device, generate tilt data corresponding to the detected tilting of the input device, and generate rotation data corresponding to the detected rotation of the input device. The processor may cause a haptic device to generate a haptic feedback in response to receiving the tilt data or rotation data, and an intensity of the haptic feedback may correspond to an amount of detected tilting or rotation of the input device. These and other embodiments are further described in the description the follows.

FIG. 1 shows a simplified diagram of a computer system 100 including an input device 130 operating on a surface, according to certain embodiments. Computer system 100 can further include computer 110, display 120, and keyboard 140. In some embodiments, input device 130 can be a computer mouse, a remote control device, a game controller (e.g., game pad, joystick, etc.), a smart phone, or other suitable device that can be used to convert analog inputs into digital signals for computer processing. For computer system 100, input device 130 can be configured to control various aspects of computer 110 and display 120 (e.g., cursor control, interfacing with an operating system running on computer 110, etc.), as would be appreciated by one of ordinary skill in the art with the benefit of this disclosure.

Computer 110 can be any suitable computing device including, but not limited to, a desktop computer, a laptop computer, a tablet computer, a smart phone, a PDA, a wearable device (e.g., smart watches, smart glasses), VR/AR systems, or the like. In some embodiments, input device 130 can be configured to provide control signals for movement tracking (e.g., 2D movement along a planar surface, 3D "in-air" movements, etc.), touch and/or gesture detection (e.g., on a touch sensitive surface), lift detection, orientation detection (e.g., in 3 degrees-of-freedom (DOF) systems, 6 DOF systems, etc.), power management capabilities, input detection (e.g., buttons, scroll wheels, etc.), output functions (e.g., LED control, haptic feedback, etc.), and a myriad of other features. Computer 110 may include a machine readable medium (not shown) that is configured to store computer code, such as input device driver software, where the computer code is executable by a processor (see, e.g., processor 410 of FIG. 4) of computer 110 to control aspects of computer 110 via input device 130, keyboard 140, or the like. The various embodiments described herein generally refer to input device 130 as a computer mouse or similar input device, however it should be understood that input device 130 can be any suitable input/output (I/O) device (e.g., user interface device, control device, input unit, or the like) that may be adapted to utilize the novel embodiments described, enabled, and/or contemplated herein.

Figure 2:
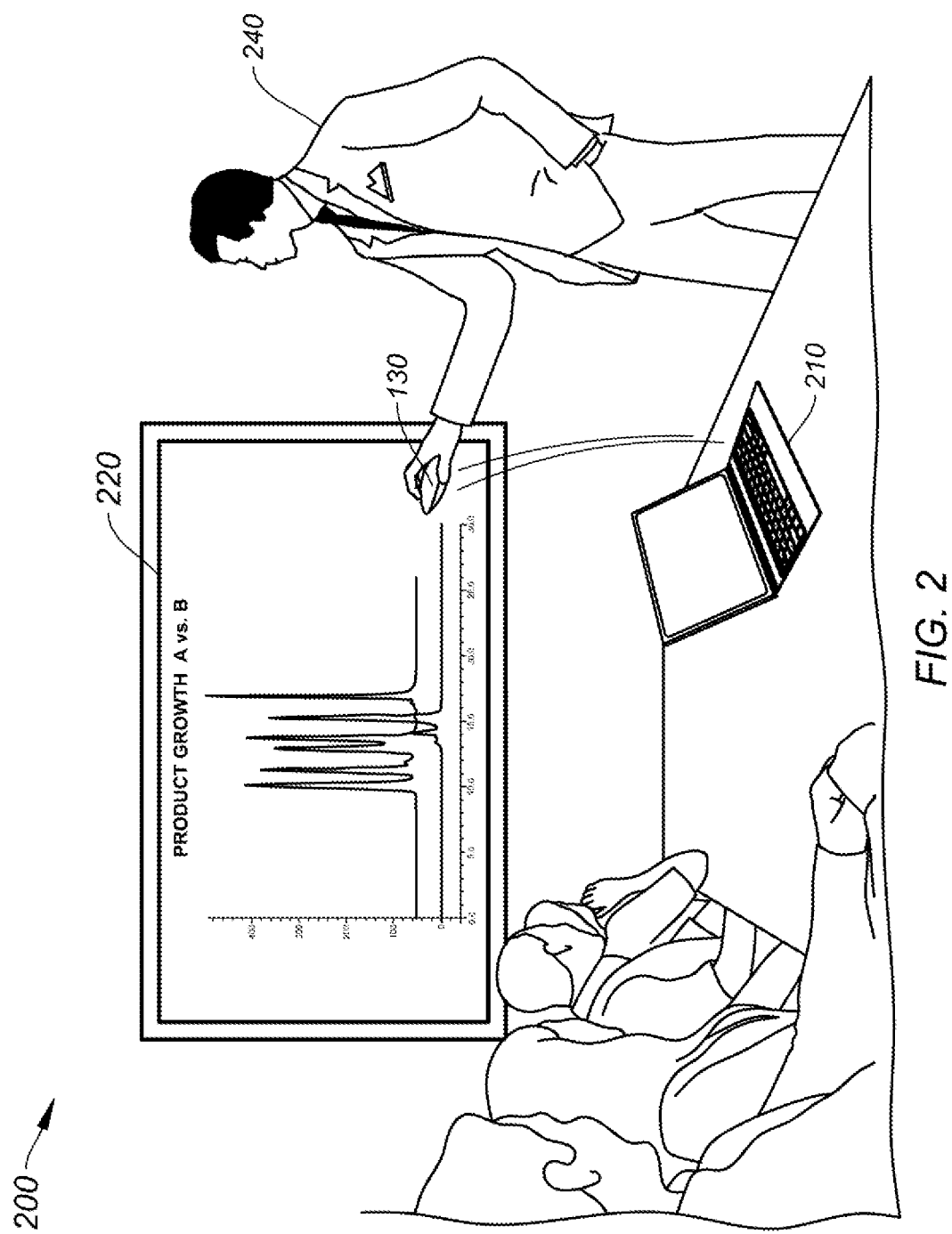
FIG. 2 shows an input device used as an in-air presenter device, according to certain embodiments.

FIG. 2 shows input device 130 used as an in-air presenter device, according to certain embodiments. Input device 130 can be configured to control various aspects of computer 210 and display 220. In scene 200, input device 130 can be initially used as a 2D mouse operating on a surface, as shown in FIG. 1. User 240 is shown picking up input device 130 and using it as a presenter device for "in-air" operation. In some embodiments, input device 130 can maintain certain functions in response to switching between modes of operation (e.g., surface use and in-air use). For instance, a touch sensitive region (as shown in FIG. 5A) may be assigned to initiate left and/or right button press functions. Input device 130 may maintain the left/right button assignment for the touch sensitive region when switching between surface and in-air use. Alternatively or additionally, input device 130 may change certain functions in response to switching between modes of operation. For example, a button on input device 130 may be configured to control a dots-per-inch (DPI) setting when operating on a surface, and that same button may be configured to initiate a "next slide" command when operating in an in-air mode (e.g., presenter mode, VR mode, etc.). In another example, an on-board IMU (see, e.g., FIG. 4) may detect when input device 130 is tilted a certain threshold angle (e.g., 45 degrees) from a horizontal plane (i.e., a "tilt" condition—further discussed below with respect to FIGS. 10A-10B). For instance, input device 130 can associate a scroll function with the tilt condition when input device 130 is operating on a surface, and associate a volume control function with the tilt condition when input device 130 is operating in an in-air mode. One of ordinary skill in the art would understand the many variations, modifications, and alternative embodiments thereof. Switching between modes of operation (e.g., surface use, in-air use, VR use) and/or recalibrating a movement (e.g., due to a repositioning of a hand) of input device 130 can be performed automatically (e.g., by input device 130 determining that input device 130 has moved a threshold distance from a surface and/or that movement detected, via an IMU, indicates that input device 130 is being operated "in air", by detecting a user's hand upon input device 130) and can be experienced by a user as a seamless and immediate transition. For example, a mode or calibration change can occur without a user specifically commanding the mode or calibration change. Instead, input device 130 may automatically change modes and/or calibration upon determining that certain criteria are met.

Figure 3:
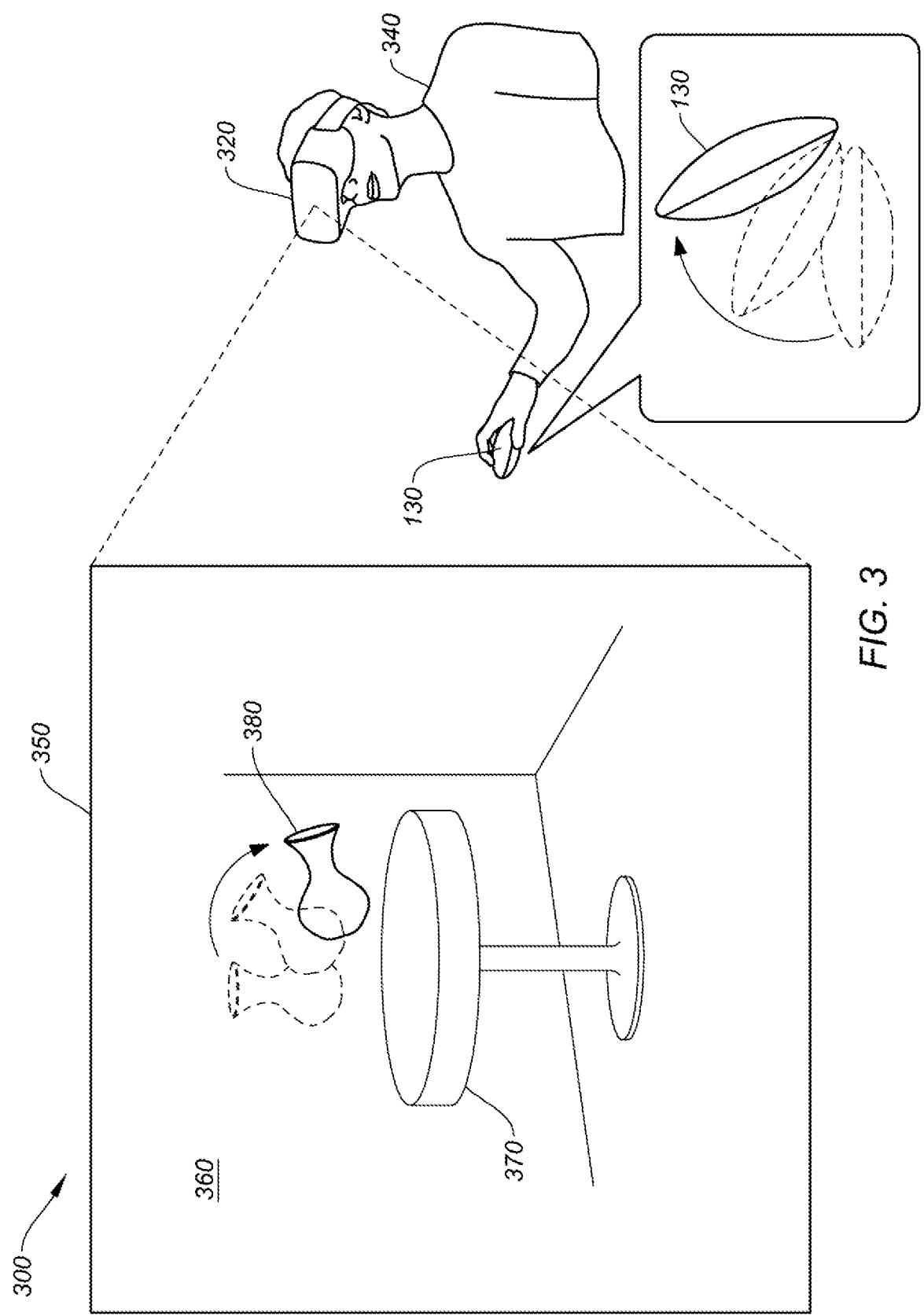
FIG. 3 shows an input device used in a VR environment, according to certain embodiments.

FIG. 3 shows input device 130 used in a VR environment, according to certain embodiments. In setting 300, user 340 is wearing HMD 320 and operating input device 130 in an in-air mode of operation. Display 350 depicts a virtual reality scene 360 generated by HMD 320 including virtual table 370 and virtual vase 380. As indicated above, certain inputs (e.g., touch detection, tilt detection, rotation detection, etc.) can perform different functions depending on the mode of operation that input device 130 is operating. For example, tilt detection may perform a first function when input device 130 is operating on a surface and a second function when operating in an in-air mode of operation. In some embodiments, tilt detection may be disabled when operating input device 130 in a VR environment, such that tilting or fully rotating may not trigger a tilt-related function. For example, referring to FIG. 3, user 340 selects vase 380 using input device 130 and manipulates vase 380 in 3D space within VR scene 360. User 340 rotates input device 130, thereby causing vase 380 to rotate in a similar fashion. Any number of functions and control schemes can be assigned to input device 130 and any change in the input/function relationship may be applied in any of the modes of operation, as would be understood by one of ordinary skill in the art with the benefit of this disclosure.

Exemplary System for Operating Dual-Mode Input Device

Figure 4:
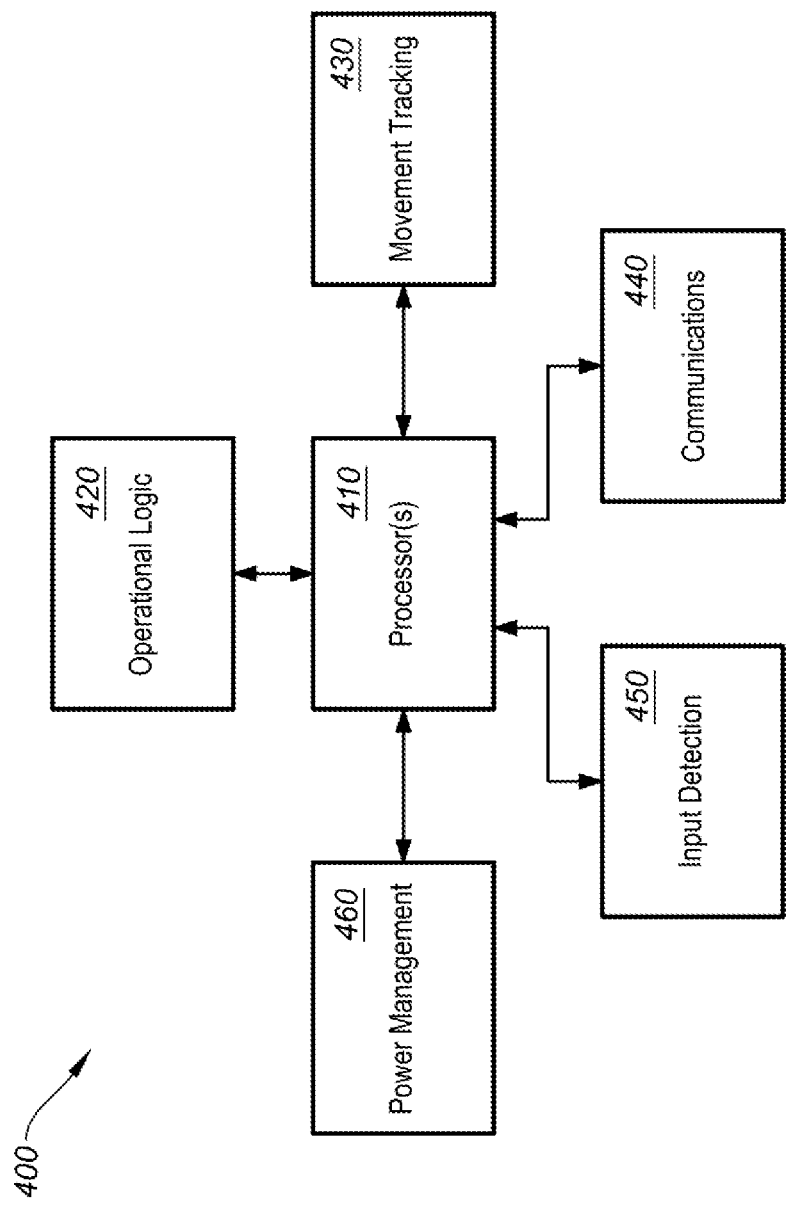
FIG. 4 shows a simplified block diagram of a system to operate an input device, according to certain embodiments.
Figure 5A:
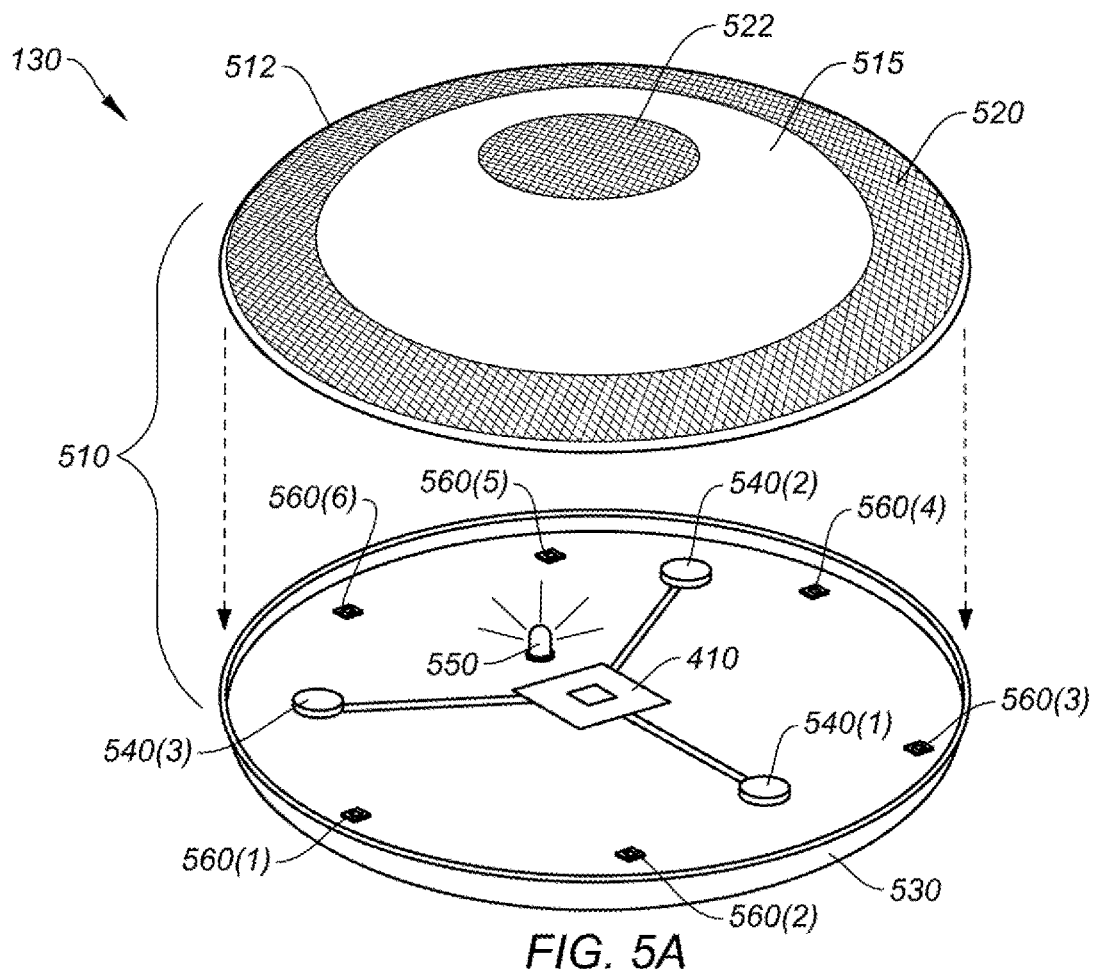
FIG. 5A shows an exploded view of an input device, according to certain embodiments.

FIG. 4 shows a simplified block diagram of a system 400 to operate input device 130, according to certain embodiments. System 400 may include processor(s) 410, operational logic block 420, movement tracking block 430, communications block 440, input detection block 450, and power management block 460. Each of system blocks 420-450 can be in electrical communication with processor 410. System 400 may further include additional systems that are not shown or described to prevent obfuscation of the novel features described herein.

In certain embodiments, processor(s) 410 may include one or more microprocessors (µPs) and can be configured to control the operation of system 400. Alternatively or additionally, processor 410 may include one or more microcontrollers (MCUs), digital signal processors (DSPs), application specific integrated circuits (ASICs), programmable logic devices (PLDs), or the like, with supporting hardware, firmware (e.g., memory, programmable I/Os, etc.), and/or software, as would be appreciated by one of ordinary skill in the art. Alternatively, MCUs, µCs, DSPs, ASICs, programmable logic devices, and the like, may be configured in other system blocks of system 400. For example, communications block 450 may include a local processor to control communication with computer 110 (e.g., via Bluetooth, Bluetooth LE, RF, IR, hardwire, ZigBee, Z-Wave, Logitech Unifying, or other communication protocol). In some embodiments, multiple processors may enable increased performance characteristics in system 400 (e.g., speed and bandwidth), however multiple processors are not required, nor necessarily germane to the novelty of the embodiments described herein. Processor(s) 410 can be disposed in input device 130, external to input device 130 (e.g., in host computing device 110 communicatively coupled to input device 130), or a combination thereof (e.g., processing performed by processors both internal and external to input device 130.

In some embodiments, operational logic block 420 can be used to control the various modes of operation for input device 130, to interpret various inputs received (e.g., by input detection block 450), and to analyze touch detection data and/or optical IR data to determine an orientation of a user's hand with respect to the housing of the input device. Input device 130 may include a standard mode of operation, an in-air mode of operation, and a VR mode of operation. The standard mode of operation can include tracking a movement of input device 130 along an underlying 2D surface, as shown in FIG. 1. The in-air mode of operation can include tracking a movement of input device 130 in 3D space, such as when used as a presenter device, as shown in FIG. 2. The VR mode of operation can include tracking a movement of input device 130 in a 3D virtual reality space, as shown in FIG. 3. It should be noted that references to the use of input device 130 in VR can be interpreted to also include use in augmented reality and mixed reality environments.

In certain embodiments, operational logic block 420 can interpret the different types inputs received by input device 130 based on the mode of operation. For instance, a detected button press may initiate a "left button click" in the standard mode of operation, a "next slide" in the in-air mode of operation, and an "object selection" or "grab" function in the VR mode of operation. In another example, a rotation of input device 130 may initiate an increase or decrease in a particular parameter (e.g., a volume, a position in a document, a zoom function) in both the standard and in-air modes of operation, but may correspond to a rotation of an virtual object in a virtual reality environment in the VR mode of operation.

In some aspects, operational logic block 420 can determine when to apply a haptic feedback (e.g., a mechanical vibration) to the input device. For example, operating logic block 420 may determine that a tilt condition or a rotation is occurring (e.g., based on data received from input detection block 450) in the standard mode of operation and initiate a haptic feedback with a corresponding intensity that can be proportional to an amount of tilt or rotation. Haptic feedback can be applied in response to any input (e.g., an acceleration, switching between modes of operation, etc.), and can be applied in any suitable manner, as would be understood by one of ordinary skill in the art. Haptic feedback is further discussed below with respect to FIG. 5A.

Operational logic block 420 can determine an orientation of a user's hand on or near a surface of a housing of input device 130, according to certain embodiments. For example, operational logic block 420 can receive touch data from one or more touch sensors configured to detect contact with a top surface of the housing (e.g., capacitive sensors) that indicates the presence of a hand. Operational logic block 420 can identify one or more fingers (e.g., a middle finger), a palm, or other features of the hand based on the received touch data, and can determine how the hand is oriented relative to the housing. Alternatively or additionally, operational logic block 420 can determine an orientation of a user's hand on or near the surface (e.g., within 5 mm) of the housing based on an optical detection system using IR LED emitter(s) ("IR emitter") and IR detectors to detect IR light reflected off the user's hand, as further discussed below with respect to FIG. 6.

Operational logic block 420 can recalibrate a movement of input device 130 based on the detected orientation of the user's hand. For instance, a user may grasp the housing of input device 130 and move it along an underlying surface in the standard mode of operation. Operational logic block 420 can use features of the detected hand (e.g., the user's middle finger, palm, or combination thereof) to set a reference point such that movement of input device 130 is based on the set reference point. The user's middle finger is an exemplary candidate for use as a reference point as it typically tracks the direction a user's hand is facing. At some time thereafter, the user may release input device 130, begin rotating the housing, and then grasp the housing again, but this time in a different location. Operational logic block 420 can then once again determine an orientation of the user's hand based on the touch data and/or optical data and recalibrate the movement of input device 130 based on the reference point.

In some cases, operational logic block 420 may dynamically reassign certain features based on an orientation of a user's hand. For example, input device 130 may have certain sections of touch sensor 520 configured to register touches as a "left click" and/or a "right click" based on the detected orientation of a user's hand. When the user releases input device 130 and then grasps input device 130 in a different orientation, operational logic block 420 can determine the orientation of the user's hand (e.g., based on the detected location of the user's middle finger) and reassign new sections of touch sensor 520 (e.g., on opposite sides of the detected middle finger) to register as left/right click inputs. Thus, the designated locations of left click and right click inputs (or any other defined function) on touch sensors 520, 522 can be dynamically modified to adjust to the location and orientation of the user's hand.

It should be understood that operational logic block 420 can be an independent entity or may be subsumed in whole or in part by processor 410. In some embodiments, operational logic block 420 can work in tandem with processor 410. In some cases, operational logic block 420 may be realized by any combination of firmware, hardware, or hardware that may be stored/located internal or external to input device 130, or a combination thereof.

Figure 5B:
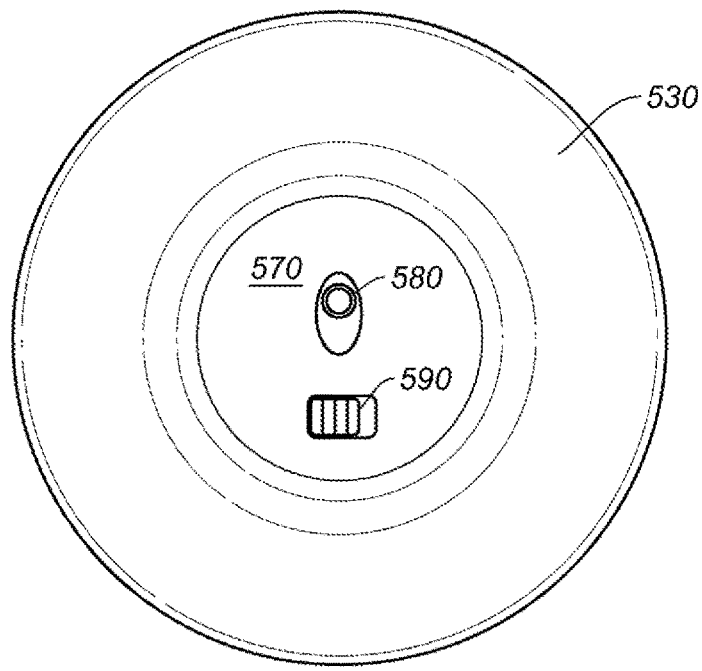
FIG. 5B shows a bottom plan view of a bottom portion of a housing for an input device, according to certain embodiments.

Movement tracking block 430 can be configured to track a movement of input device 130. Movement tracking block 430 can use optical sensors (e.g., an image sensor) such as a light-emitting diode (LEDs) and an imaging array of photodiodes to detect a movement of input device 130 relative to an underlying surface. Input device 130 may optionally include movement tracking hardware that utilizes coherent (laser) light. In certain embodiments, an optical sensor is disposed on the bottom side of input device 130, as shown in FIG. 5B. Movement tracking block 430 can provide positional data (e.g., two-dimensional (2D) movement data) or lift detection data. For example, an optical sensor can detect when a user lifts input device 130 off of a work surface and can send that data to processor 410 and/or operational logic block 420 to an appropriate mode of operation or corresponding function. In some embodiments, movement tracking using an optical sensor is typically used in the standard mode of operation.

In certain embodiments, an IMU including accelerometer(s) can be used for movement detection. Accelerometers can be electromechanical devices (e.g., micro-electromechanical systems (MEMS) devices) configured to measure acceleration forces (e.g., static and dynamic forces). One or more accelerometers can be used to detect 3D positioning and/or movement. For example, 3D tracking can utilize a three-axis accelerometer or two two-axis accelerometers). Accelerometer data can further be used to determine if input device 130 has been lifted off of a surface and can provide 3D movement data that may include the velocity, physical orientation, and acceleration of input device 130. In some embodiments, gyroscope(s) and/or magnetometers can be used in lieu of or in conjunction with accelerometer(s) to determine movement or an orientation of input device 130. IMUs can be used to track 3D movement for in-air and VR applications.

In some embodiments, input device 130 may be tracked by or in conjunction with external tracking systems. For example, input device 130 may include externally mounted LEDs and/or sensors to detect signals from "lighthouses." This information can be used in conjunction with the internal orientation detect sensors (e.g., IMU or IR detection) and can be used to track a 3D position of input device 130.

Communications block 440 can be configured to enable communication between input device 130 and computer 110, or other devices and/or peripherals, according to certain embodiments. Communications block 440 can be configured to provide wireless connectivity (e.g., radio-frequency (RF), Bluetooth, BLE, infra-red (IR), ZigBee, Z-Wave, Logitech Unifying, or the like) to computer 110 or other wireless devices. System 400 may include a hardwired connection to computer 110 (e.g., Universal Serial Bus (USB), FireWire, etc.). For example, input device 130 can be configured to receive a USB cable to enable bi-directional electronic communication with computer 110 or other external devices. Some embodiments may utilize different types of cables, connection protocols, or communication standards to establish hardwired communication with other entities.

Input detection block 450 can control the detection of button activation (e.g., main buttons, side buttons, a scroll wheel button, etc.), scroll wheel and/or trackball manipulation (e.g., rotation detection), sliders, switches, touch sensors (e.g., one and/or two-dimensional touch pads), and the like. In some embodiments, input detection block 450 can detect when a key plate (e.g., left mouse button) or the housing is depressed with a sufficient force (e.g., a threshold force) such that it contacts and activates a force sensor (e.g., an actuator). The force sensor may generate a corresponding control signal (e.g., human interface device (HID) signal) to control a computing device (e.g., computer 110) communicatively coupled to the input device (e.g., instantiating a "left click" on the computer). Alternatively, the functions of input detection block 450 can be subsumed by processor 410, or in combination therewith.

In some embodiments, input detection block 450 can detect a touch or touch gesture on one or more touch sensitive surfaces on input device 130. Input detection block 450 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof.

Input detection block 450 can include touch and/or proximity sensing capabilities. Some examples of the types of touch/proximity sensors may include, but are not limited to, resistive sensors (FSRs), (e.g., standard air-gap 4-wire based, based on carbon loaded plastics which have different electrical characteristics depending on the pressure, interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, ultrasonic sensors, etc.), or the like. In some embodiments, input detection block 450 can detect the presence of a user's hand on a top surface of a housing of the input device by optical detection.

Input detection block 450 optical detection capabilities directed to detecting the presence and orientation of a user's hand with respect to a housing of input device 130. For instance, one or more IR LED emitters may be disposed in the housing and configured to emit IR light out through an IR transparent portion of a top surface of the housing (see, e.g., FIG. 6). Light reflected off of a user's hand positioned along the top surface of the housing can be reflected back into the housing and detected by one or more IR detectors disposed in the housing. Based on the detected IR light, a processor (e.g., processor(s) 410) and/or corresponding logic (e.g., operational logic block 410) can determine an orientation of the user's hand on the housing by identifying certain fingers, the user's palm, or other features of the hand that can be used to help determine how the user is interfacing input device 130, as further discussed below with respect to FIG. 6.

Power management block 460 can be configured to manage power distribution, recharging, power efficiency, and the like, for input device 130. In some embodiments, power management block 460 can include a battery (not shown), a USB-based recharging system for the battery (not shown), power management devices (e.g., low-dropout voltage regulators—not shown), and a power grid within system 400 to provide power to each subsystem (e.g., communications block 440, etc.). In certain embodiments, the functions provided by power management block 460 may be incorporated into processor(s) 410. Alternatively, some embodiments may not include a dedicated power management block. For example, functional aspects of power management block 460 may be subsumed by another block (e.g., processor(s) 410) or in combination therewith.

Although certain systems may not expressly discussed, they should be considered as part of system 400, as would be understood by one of ordinary skill in the art. For example, system 400 may include a bus system to transfer power and/or data to and from the different systems therein. In some embodiments, system 400 may include a storage subsystem (not shown). A storage subsystem can store one or more software programs to be executed by processors (e.g., in processor(s) 410). It should be understood that "software" can refer to sequences of instructions that, when executed by processing unit(s) (e.g., processors, processing devices, etc.), cause system 400 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 400 is meant to be illustrative and that many variations and modifications are possible, as would be appreciated by one of ordinary skill in the art. System 400 can include other functions or capabilities that are not specifically described here (e.g., mobile phone, global positioning system (GPS), power management, one or more cameras, various connection ports for connecting external devices or accessories, etc.). While system 400 is described with reference to particular blocks (e.g., input detection block 450), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 400 may be combined with or operated by other sub-systems as informed by design. For example, power management block 460 and/or movement tracking block 430 may be integrated with processor(s) 410 instead of functioning as a separate entity.

FIG. 5A shows an exploded top perspective view of input device 130, according to certain embodiments. Input device 130 includes housing 510, which can be referred to as an enclosure or chassis. Generally, a housing can be an enclosure to both contain various electronics that perform the operations of the input device (e.g., system 400) and to function as an interface to receive a user's hand and corresponding user interactions (e.g., touch, swipes, tilting, lifting, rotation, etc.). Housing 510 can include a top portion 512 and a bottom portion 530. Housing 510 is shown to be in the shape of a pill or flying saucer, however any suitable shape or dimensions can be used including a puck shape, spherical shape, oval shape, or any suitable shape. The shape may be configured such that a particular orientation is not connoted based on the shape alone. Round shapes, for instance, can exhibit a uniform feel for the user regardless of the orientation that the user grasps the input device. This can be useful when the user can not physically see the input device (e.g., when immersed in a virtual reality environment), which can allow the user to immediately use the device when grasped (and subsequently calibrated) without having to reorient their hand to accommodate a particular default orientation as may typically be found in conventional input devices.

In some embodiments, one or more touch sensitive sensors ("touch sensors") 520, 522 can be disposed on top portion 512 of housing 510. Touch sensors can be arranged as continuous concentric regions, as shown. In some cases, the touch sensors may be wider or narrower, uniform or non-uniform, continuous or discontinuous (e.g., in sections), symmetrical or asymmetrical, or any combination thereof to cover some or all of top portion 512. Generally, touch sensors should have enough coverage on top portion 512 to accurately detect a location and orientation of a user's hand on the housing, regardless of its orientation, with enough resolution to identify and differentiate between fingers (e.g., to identify a user's middle finger), a user's palm, and/or other features of the user's hand to establish a reference point to facilitate the movement calibration operations discussed herein. Alternatively or additionally, optical detection using IR sensing can be used to determine an orientation of a hand on the housing (see, e.g., FIG. 6). In such cases, top portion 512 may include an IR transparent region 515 for the IR light to pass through. Alternatively, top portion 512 may be transparent or semi-transparent to certain frequencies/bands in the visible light spectrum for embodiments emitting/detecting visible light to both determine an orientation of a user's hand on the housing and provide an aesthetic visual effect, which may include changing colors, strobing, intensity modulations, or other light effects.

In some embodiments, other input features can be included in top portion 512 or bottom portion 530 including mechanical buttons (e.g., using scissor-type or dome key structures), sliders, or other suitable input feature, as would be appreciated by one of ordinary skill in the art.

In certain embodiments, bottom portion 530 of housing 510 can be configured to receive top portion 512 such that they couple together by a frictional fit, by mechanical means (e.g., screws, bolts, hardware, etc.), by threading on housing 510 for a screw-on fit, or other suitable method. Bottom portion 530 can include processor(s) 410, one or more haptic devices 540(1-3), one or more IR LED emitter 550, and one or more IR light detectors 560(1-6).

Processor(s) 410 may control the operation of haptic devices 540, IR LED emitter 550, and IR light detectors 560. Alternatively or additionally, some or all of haptic devices 540, IR LED emitter 550, and IR light detectors 560 may be controlled by operational logic block 420, input detection block 450, or any combination thereof.

Haptic devices 540 are shown to be distributed near the edges of input device 130 at 120 degree intervals, although any number of haptic devices may be used in any location or suitable distribution. Haptic devices 540 can be linear resonant actuators, or other suitable haptic devices that can produce a haptic output. In some implementations, in response to detecting a tilt condition in the standard mode of operation, processor(s) 410 and/or operational logic block 420 may cause some or all of haptic devices 540(1-3) to generate a haptic feedback that corresponds to an amount of tilt, such that a small tilt (e.g., less than 10 degrees) may be associated with a low intensity haptic feedback (e.g., a weak vibration, reduced haptic frequency), and a large tilt (e.g., greater than 20 degrees) may be associated with a high intensity haptic feedback (e.g., a strong vibration, increased haptic frequency). Haptic feedback can be applied in any suitable manner and across all modes of operation. Haptic feedback may be uniform between modes of operation (e.g., tilting on a surface or in-air produces a haptic feedback) or non-uniform (e.g., tilt detection may not be a recognized condition in a VR environment). One of ordinary skill in the art would understand the many variations, modifications, and alternative embodiments thereof.

As indicated above, optical detection can be used to detect the presence a user's hand on an input device using one or more IR LED emitters and IR detectors. Referring to FIG. 5A, bottom portion 530 includes one or more IR LED emitters 550 disposed in housing 510. IR emitters can be disposed on a printed circuit board (PCB), a module, a bracket, on housing 510, or other mounting implementation. IR emitter 550 can be configured to emit IR light in an omnidirectional emission pattern, a focused emission pattern, or in any suitable emission pattern to emit light up through a transparent region of top portion 512 of housing 510. In some embodiments, the transparent region may be IR transparent or semi-transparent, but opaque for light in the visible spectrum (400 nm-700 nm or any subset thereof). IR light may be reflected off of a user's hand and back down through the IR transparent surface, which can be detected by one or more of IR detectors 560(1)-560(6). Multiple IR emitters may be used. In some cases, more or fewer IR detectors may be used. IR detectors are typically configured near the perimeter of input device 130 to detect IR light most likely to have been reflected off certain features of the user's hand, including the user's middle finger (e.g., to identify a direction that the user's hand is pointing), the index and ring finger (e.g., to indirectly detect a direction that the user's hand in pointing, such as a mid-point between them), a user's palm, or any combination of fingers and hand features that can be used to enable operational logic 420 to deduce the orientation of the user's hand on input device 130.

FIG. 5B shows a bottom plan view of bottom portion 530 of a housing for input device 130, according to certain embodiments. Bottom portion 530 may have a rounded contour to facilitate tilting and a flat portion 570 for stability when input device 130 is resting on a surface. Flat portion 570 may include optical sensor 580 for tracking 2D movement of input device 130 along an underlying surface.

Optical sensors are further discussed above with respect to FIG. 4. Flat portion 570 may further include one or more feet, a coating, or covering for reducing friction as input device 130 is moved along an underlying surface. Top portion 512 and bottom portion 530 may include other features including power switch 590, host selection buttons (e.g., for selecting any one of a plurality of host computers that input device 130 is communicatively coupled to), communication selection buttons (e.g., selecting between Bluetooth® communication protocols, IR, ZigBee, Z-Wave, Logitech Unifying, or other suitable communication protocol), output devices (e.g., speakers, LEDs), or the like.

Examples Embodiments for Performing a Movement Calibration for an Input Device

FIGS. 6A-6C show aspects of a movement calibration process for input device 130 using touch detection, according to certain embodiments. In FIG. 6A, as user's hand 610 grasps input device 130 at position A (shown in the dashed lines), system 400 (e.g., operational logic block 420) detects an orientation 620(a) of user's hand 610 with respect to housing 510 of input device 130 based on certain detected features of hand 610 and calibrates a movement detection for input device 130 accordingly. The detected orientation 620(a) may be based on a location of a detected middle finger of hand 610 with respect to housing 510 of input device 130. Alternatively or additionally, other fingers (e.g., ring finger, index finger, etc.) or features (e.g., palm) of hand 610 can be used to determine the orientation 620(a) of hand 610 with respect to housing 510, as discussed above. Any suitable method of hand detection can be used including touch-sensor-based detection (see, e.g., FIG. 5A), optical-sensor-based detection (see, e.g., FIG. 7), pressure-based detection (e.g., via haptic sensors disposed around housing 510, mechanical detection plates, etc.), or the like, as would be understood by one of ordinary skill in the art with the benefit of this disclosure. Some of the examples herein describe a "grasping" of input device 130, however it should be understood that hand orientation detection can be performed whether a user is grasping the input device, resting a hand on the input device, holding the input device, or merely wholly or partially contacting input device 130 with their hand. In some cases, hand orientation detection can be performed when a user is hovering their hand over input device 130. This may help increase the calibration speed or include pre-calibration steps as system 400 may estimate how hand 610 will interface with housing 510 based on how a hovering or approaching hand may move towards and engage input device 130, as would be understood by one of ordinary skill in the art with the benefit of this disclosure.

In some aspects, movement calibration can be performed by using one or more hand features as a reference to determine corresponding movement coordinates (e.g., Cartesian x, y, z coordinates, polar coordinates, etc.). For example, a line corresponding to the detected location of a user's middle finger (e.g., a determined line along the length of the middle finger) may be used to calibrate a forward/backward (e.g., y-axis) movement of input device 130. In some instances, other references can be used to calibrate movement, such as a determined line corresponding to a detected location of a different finger, a combination of fingers and/or hand features, an averaged or composite angle with respect to one or more fingers or hand features (e.g., detected palm), etc. Once a reference is defined, movement in other directions can be calibrated based on the that reference, as would be understood by one of ordinary skill in the art.

In some implementations, a correction factor or skew can be incorporated into a calibration. For instance, some users may tend to naturally move input device 130 along an underlying surface based on an alignment that is +/−1 to 10 degrees off of the line defined by their middle finger. In such cases, a calibrated movement can be skewed manually (e.g., via software configured to control the operation of input device 130) or automatically to accommodate different users. Skew may be determined automatically by any suitable methods. For example, calibration software may ask a user to move input device 130 in a number of directions to determine how to adjust movement calibration. Multiple profiles may be used for multiple users such that a first user, which may be detected based on detected properties of the hand including finger/palm dimensions, can have a first calibration setting, and a second user can have a second calibration setting. In some cases, machine learning can be employed to determine skew in movement over time and adjust a user's profile over time. One of ordinary skill in the art would understand the many variations, modifications, and alternative embodiments thereof.

Referring back to FIG. 6A, hand 610 moves input device 130 from position A to position B and maintains its orientation (e.g., finger(s), palm, etc., do not move) with respect to housing 510. In response to the movement of input device 130, system 400 may maintain the detected orientation 620(a) and calibrated movement settings as the relationship of the position of hand 910 on input device 130 remains the same.

In FIG. 6B, hand 610 releases input device 130 at position B and moves to position C while input device 130 stays in place. In some embodiments, input device 130 may maintain the most recent movement calibration settings when a user releases (e.g., stops touching) input device 130 until a new hand contact/detection and corresponding orientation is detected. Alternatively, the movement calibration setting may return to a default setting after release (e.g., a hand is no longer detected) or after a threshold time thereafter (e.g., 5 minutes). One of ordinary skill in the art would understand the many variations, modifications, and alternative embodiments thereof.

In FIG. 6C, hand 610 moves from position C to position D and grasps input device 130. System 400 then detects an orientation 620(b) of user's hand 610 with respect to housing 510 of input device 130 based on the detected features of hand 610, as described above, and calibrates a movement detection for input device 130 accordingly. Note that previous orientation 620(a) switches to 620(b) when the new hand orientation is detected.

Figure 7:
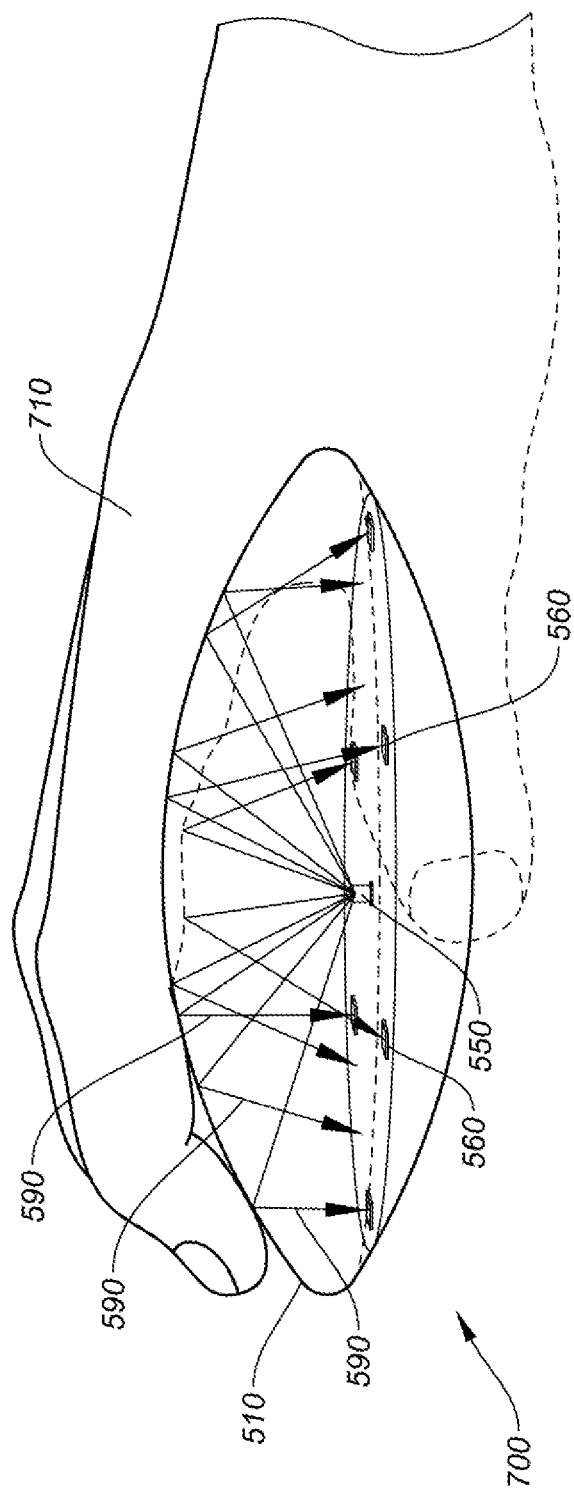
FIG. 7 shows aspects of a movement calibration process for an input device using optical detection, according to certain embodiments.

FIG. 7 shows aspects of a movement calibration process for input device 130 using optical detection, according to certain embodiments. Optical detection can be used to detect the presence and orientation of a user's hand on an input device using one or more IR LED emitters and IR detectors, as further described above with respect to FIG. 5A. Referring to FIG. 7, IR LED emitter 550 emits IR light in an omnidirectional emission pattern that passes up through an IR transparent region of housing 510. IR light 690 may be reflected off of hand 710 and back through the IR transparent surface. One or more of IR detectors 560(1)-560(6) can detect the reflected IR light and operational logic 420 (or other suitable system 400 resource) may deduce the orientation of the user's hand on housing 510 based on the reflected light, as further discussed above. In some embodiments, optical detection can be used in conjunction with touch detection (e.g., see FIG. 6A-C) for improved accuracy.

Figure 8:
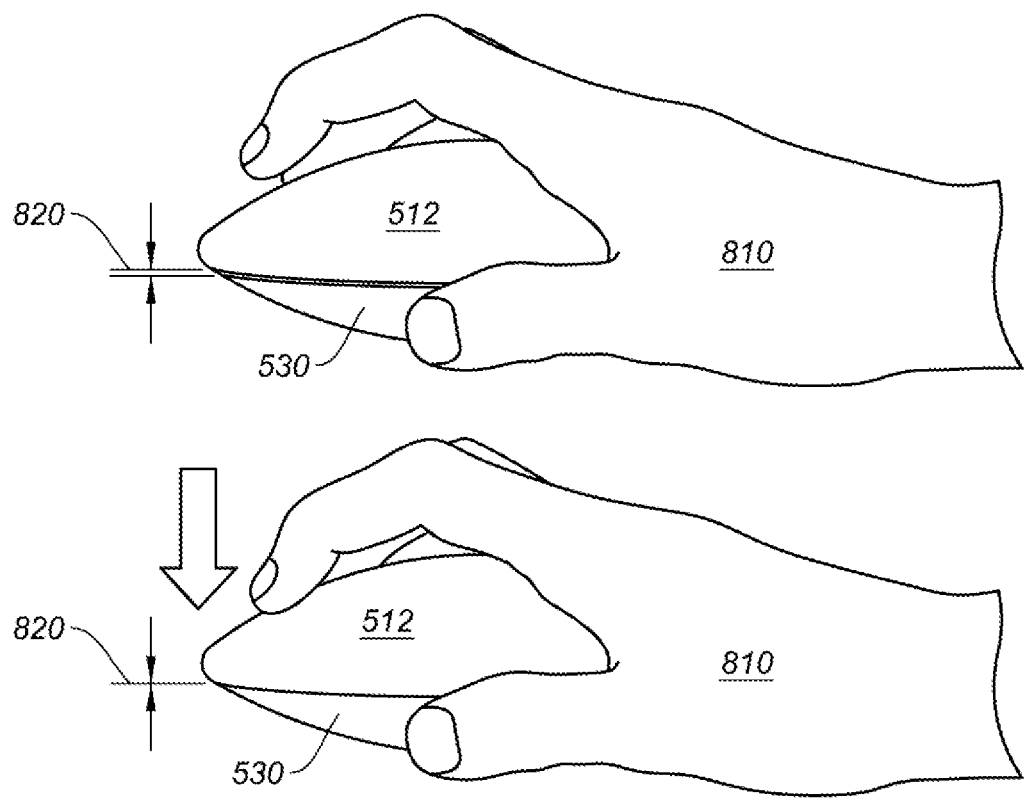
FIG. 8 shows aspects of a depressible housing, according to certain embodiments.

FIG. 8 shows aspects of a depressible housing 510, according to certain embodiments. Housing 510 may include top portion 512 and bottom portion 530. In some implementations, a switch (e.g., mechanical switch, force sensor, relay, etc.) may be disposed in housing 510 such that a button press signal is generated (e.g., in conjunction with input detection block 450) when top portion 512 is depressed. Referring to FIG. 8, input device 130 includes gap 820 between top portion 512 and bottom portion 530. When the user applies a force on top portion 512, gap 820 collapses as top portion 512 moves towards bottom portion 530 and triggers a button press signal. Any suitable function can be associated with the button press signal including left/right mouse click functions, changes to the operation of input device 130 (e.g., switching to another host computer, changing a DPI setting, etc.), or the like. One of ordinary skill in the art would understand the many variations, modifications, and alternative embodiments thereof.

The switch may be a mechanical switch, which can typically include a physical movement of top portion 512 and bottom portion 530 with respect to each other (e.g., thereby closing gap 720). In some embodiments, a force sensor can be employed (e.g., on a bottom surface of input device 130) such that a sufficient force on top portion 512 triggers a button press (e.g., 10-30 gram-force), despite no actual physical movement between top portion 512 and bottom portion 530. In some cases, haptic sensors configured for force detection can be used in a similar manner. Any suitable method of detecting a depression force on input device 130 in the manner described above may be employed.

Figure 9:
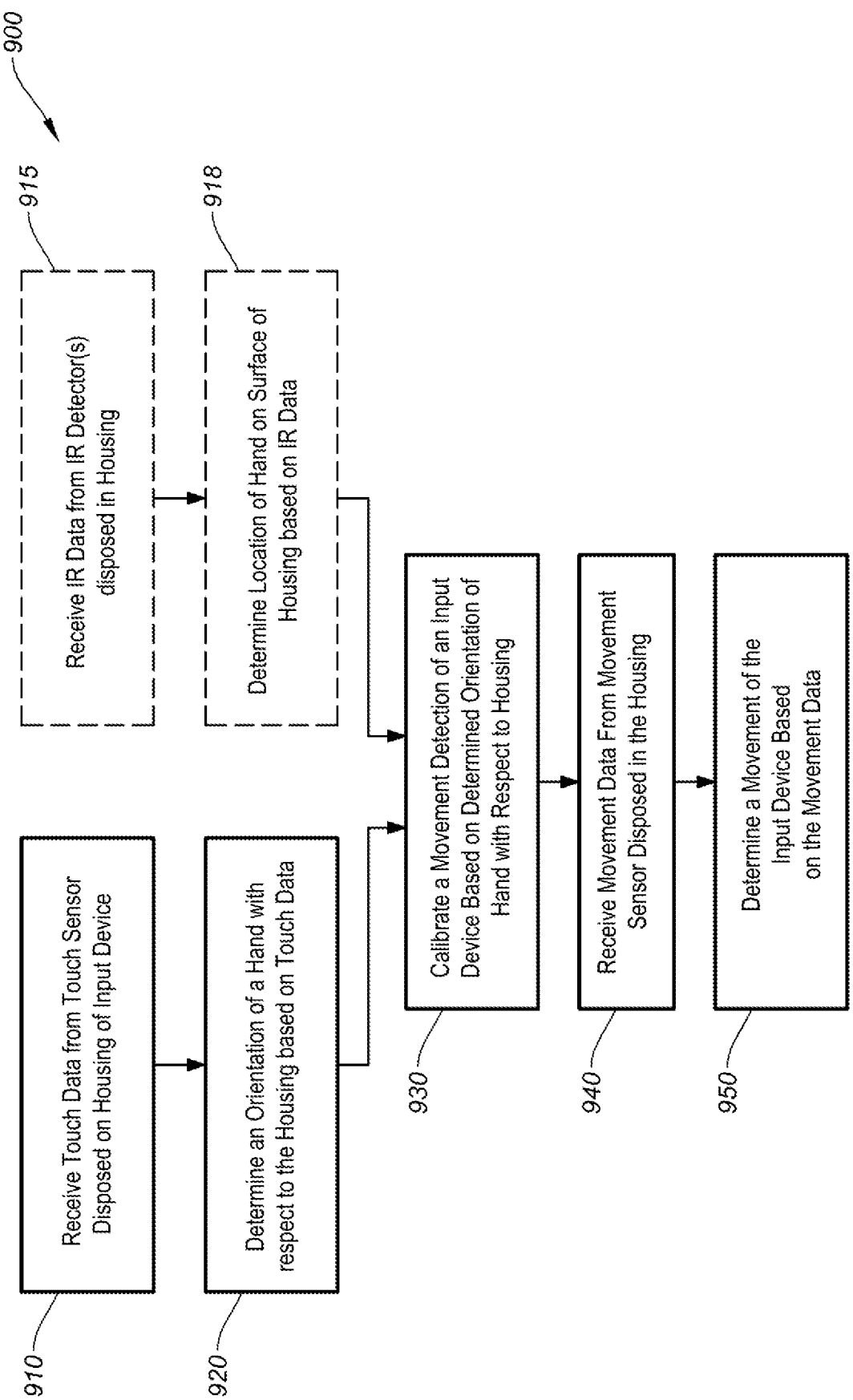
FIG. 9 is a simplified flow chart showing aspects of a method for movement calibration, according to certain embodiments.

FIG. 9 is a simplified flow chart showing aspects of a method 900 for movement calibration for an input device, according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by processor 410 of system 400, by resources in operational logic block 440, or a combination thereof, as shown and described above with respect to FIG. 4.

At step 910, method 900 can include receiving touch data from touch sensor 520 disposed on housing 510 of input device 130. The touch data may corresponding to a detected presence of a hand on or near the surface of housing 510. In some embodiments, touch data may be received from one or more touch sensors disposed on top portion 512 (e.g., to detect portions of a user's fingers, palm, or other features of the hand) and/or bottom portion 530 (e.g., to detect finger tips, etc.). Generally, the more surface area of housing 510 covered by touch sensitive sensors, the more hand features may be detected, which can improve image detection accuracy. Touch sensors can be capacitive sensors, resistive sensors, or the like. In some implementations, heat sensing devices may be used to detect where portions of a hand are contacting housing 510. Alternatively or additionally, heat sensing elements may be disposed on housing 510 in a similar manner as touch sensors 520, 522, or in any suitable location. In some embodiments, force sensors can be employed over areas on input device 130 to detect how a user's hand is distributed over housing 510. The examples provided herein are not intended to be all-inclusive and other types of sensing devices/systems may be employed to work in conjunction with or in lieu of the embodiments described and depicted herein, as would be understood by one of ordinary skill in the art with the benefit of this disclosure.

At step 920, method 900 can include determining an orientation of the hand with respect to housing 510 based on the touch data. As indicated above, patterns of detected areas indicating a touch by a user's hand can be analyzed (e.g., by operational logic block 440) to determine a location of individual fingers, a palm, portions of the oblique arches, longitudinal arches of the fingers, transverse carpal arch, transverse metacarpal arch, or other features of the hand. By positively identifying certain features (e.g., a middle finger), system 400 (or subsystems thereof) can determine how the hand is orientated relative to underlying housing 510.

At step 930, method 900 can include calibrating the determined movement of the input device based on the determined orientation of the hand with respect to the housing. In some embodiments, determining the orientation of the hand with respect to the housing can further include determining the location of a middle finger and/or a palm of the hand (or other hand feature), and using the determined hand feature as a reference point to be used to later calibrate the determine movement of the input device. As indicated above, any detected feature or set of features of the hand can be used to determine the orientation of the hand.

At step 940, method 900 can include receiving movement data from one or more movement sensors disposed in or on the housing of the input device. Movement data may corresponding to a detected movement of input device 130. In some embodiments, the movement sensor can be an optical sensor configured to detect a 2D movement of the input device relative to an underlying surface, one or more sensors (e.g., accelerometer, gyroscope) configured to detect 3D movement or position in 3D space (or 2D movement along a surface) of the input device, or a combination thereof.

At step 950, method 900 can include determining a movement of the input device based on the movement data. This can be performed in whole or in part by movement tracking block 430, operational logic 420, processor 410, or any combination of resources from system 400. The determined movement can be a calibrated measurement based on the determined orientation of the hand (or feature thereof) with respect to the housing. Although the embodiments described herein generally refer to the housing as the point of reference, it would be understood by one of ordinary skill in the art that other reference points can be used. For example, a hand feature can be compared to a location of a particular sensor, input device feature (e.g., a palm region or other sub-portion of the housing), etc.

Alternatively or additionally, step 915 may be included in method 900 to incorporate optical detection of a hand on input device 130. At step 915, method 900 can include receiving IR data from one or more IR detectors 560 (1-6) disposed in housing 510. The one or more IR detectors may be configured to receive reflected IR light emitted by IR emitter(s) 550 (e.g., disposed in housing 510) and reflected off of a hand configured on or near the top surface of housing 510. In certain embodiments, method 900 can further include detecting a position of the hand on the surface of the housing based on the detected IR data (step 918). In instances where optical detection is used, determining the orientation of the hand with respect to the housing (step 920) is further based on the detected position of the hand based on the IR data.

It should be appreciated that the specific steps illustrated in FIG. 9 provide a particular method 900 for establishing a wireless connection with a mobile input device, according to certain embodiments. Other sequences of steps may also be performed according to alternative embodiments. For example, alternative embodiments may perform the steps outlined above in a different order. Moreover, the individual steps illustrated in FIG. 9 may include multiple sub-steps that may be performed in various sequences as appropriate to the individual step. For example, some embodiments may only employ touch detection, optical detection, heat detection, etc., while others may employ varying combinations thereof. Furthermore, additional steps may be added or removed depending on the particular applications. This concept is represented in FIG. 9 by the inclusion of dashed lines around certain optional method steps. Any combination of changes can be used and one of ordinary skill in the art with the benefit of this disclosure would understand the many variations, modifications, and alternative embodiments thereof.

Tilt and Rotation Detection

In some embodiments, input device 130 can perform tilt and rotate functions in addition to x-y movements along a surface or in-air movement detection. Some aspects of tilt and rotate functions are described below.

FIG. 10A shows a tilt function on an input device, according to certain embodiments. Input device 130 is shown resting on an underlying surface. Display 1010 depicts a chart 1015 displaying data. Input device 130 is tilting forward causing chart 1015 to pan downward by an amount proportional to the detected tilt. In some embodiments, a tilt condition can be detected in response to input device 130 tilting beyond a threshold angle relative to an underlying surface (e.g., a binary control). For instance, a tilt condition may be detected when input device 130 is tilted 20 degrees or more (or any suitable angle) by one or more sensors, for example packaged in an IMU, such as accelerometers and/or gyroscopes). In other embodiments, a tilt condition can be an analog control such that increasing or decreasing amounts of tilt may modify one or more parameters on a display in an increasing or decreasing manner.

In some cases, input device 130 can include movement sensor(s) disposed in the housing and controlled by the processor, where the one or more sensors are configured to detect a 3D movement of the input device. A tilt condition may be detected based on movement data from the movement sensor where the tilt condition corresponds to input device 130 tilting beyond a threshold angle relative to a horizontal plane.

Tilt detection may be detected when input device 130 is operating on a surface or in an in-air mode of operation. In some embodiments, tilt detection may only be implemented while input device 130 is operating on an underlying surface. For example, tilt detection may be employed while optical sensor 580 detects an underlying surface, one or more movement sensors detect that input device 130 is substantially stationary (e.g., indicating that input device 130 is resting on a stable surface and not held by a user). The tilt function can be configured to control any suitable function including, but not limited to, panning images on a display, controlling a volume on a media player, scrolling a document, adding a new dimension of control (e.g., pitch, yaw, roll) in a game or 3D environment, etc. FIG. 10B shows a second tilt function on an input device, according to certain embodiments. Display 1040 depicts a chart 1045 displaying a media player and corresponding controls. Input device 130 is tilting to the right causing a selection of a "next track" function on the media player.

FIG. 10C shows a rotation function on an input device, according to certain embodiments. Display 1080 depicts a media player and volume control 1085. Input device 130 is rotating clockwise causing the volume to increase, as if input device 130 were a knob on a media controlling device. As indicated above, input device 130 can include one or more sensors configured to detect a rotation of input device 130.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An input device comprising:
a housing having a top surface;
a sensor configured to:
  detect a contact on the top surface of the housing by at least a portion of a hand of a user; and
  generate touch data corresponding to the detected contact by the portion of the hand; and
one or more processors configured to:
  receive the touch data from the sensor;
  determine an orientation of the portion of the hand with respect to the housing based on the touch data;
  calibrate a movement direction of the input device relative to the orientation of the portion of the hand; and
  configure a section of the top surface to register a left click mouse function, based on the determined orientation of the portion of the hand with respect to the housing.

2. The input device of claim 1, wherein a shape of the input device is configured such that a particular orientation of the input device is not connoted based on the shape alone.

3. The input device of claim 1, wherein:
the section of the top surface is a first section; and
the one or more processors are configured to configure a second section of the top surface to register a right click mouse function, based on the determined orientation of the portion of the hand with respect to the housing.

4. The input device of claim 1, wherein:
the input device comprises a bottom surface;
the bottom surface is saucer shaped having a concave curvature; and
the top surface is saucer shaped, having a curved surface with a curvature opposite the concave curvature of the bottom surface.

5. The input device of claim 1, wherein:
the housing has top portion separated by a gap from a bottom portion;
the top surface is part of the top portion; and
the one or more processers are configured to trigger a button press signal in response to the top portion being pressed toward the bottom portion.

6. The input device of claim 1, wherein the sensor is a touch sensor.

7. The input device of claim 1, wherein the sensor is an optical sensor.

8. The input device of claim 1, wherein the portion of the hand includes a finger of the hand.

9. The input device of claim 1, wherein:
the orientation is a first orientation;
the movement direction is a first movement direction; and
the one or more processers are configured to:
    determine a second orientation of the portion of the hand on the top surface of the housing, after calibrating the first movement direction;
    calibrating a second movement direction of the input device relative to the second orientation of the portion of the hand; and
    reassigning a new section of the housing to register the left click mouse function, based on the second orientation of the portion of the hand on the top surface of the housing.

10. A method comprising:
receiving, by one or more processors, touch data from a sensor of an input device, the touch data corresponding to a detected presence of a portion of a hand of a user on a top surface of a housing;
determining, by the one or more processors, an orientation of the portion of the hand on the top surface of the housing;
calibrating, by the one or more processors, a movement direction of the input device relative to the orientation of the portion of the hand; and
configuring a section of the top surface to register a left click mouse function, based on the determined orientation of the portion of the hand on the top surface of the housing.

11. The method of claim 10, wherein the sensor is a touch sensor.

12. The method of claim 10, further comprising:
detecting a tilt of the input device; and
triggering a scroll signal based on the tilt of the input device.

13. The method of claim 10, wherein the sensor is an optical sensor.

14. The method of claim 10, wherein:
the section is a first section; and
the method further comprises configuring a second section of the top surface to register a right click mouse function, based on the determined orientation of the portion of the hand on the top surface of the housing.

15. The method of claim 10, wherein the orientation is a first orientation, the movement direction is a first movement direction, and the method further comprises:
determining, by the one or more processors, a second orientation of the portion of the hand on the top surface of the housing, after calibrating the first movement direction;
recalibrating, by the one or more processors, movement of the input device by calibrating a second movement direction of the input device relative to the second orientation of the portion of the of the hand; and
reassigning a new section of the housing to register the left click mouse function, based on the second orientation of the portion of the hand on the top surface of the housing.

16. A method comprising:
receiving, by one or more processors, touch data from a sensor of an input device, the touch data corresponding to a detected presence of a hand of a user on a surface of the housing;
determining, by the one or more processors, a first orientation of the portion of the hand on the surface of the housing;
calibrating, by the one or more processors, a first movement direction of the input device relative to the first orientation of the portion of the hand;
configuring a section of the housing to register a left click mouse function, based on the first orientation of the portion of the hand of the user on the surface of the housing;
determining, by the one or more processors, a second orientation of the portion of the hand on the surface of the housing, after calibrating the first movement direction;
recalibrating, by the one or more processors, movement of the input device by calibrating a second movement direction of the input device relative to the second orientation of the portion of the hand; and
reassigning a new section of the housing to register the left click mouse function, based on the second orientation of the portion of the hand on the surface of the housing.

17. The method of claim 16, wherein:
the section is a first section;
the new section is a first new section; and
the method further comprises:
    configuring a second section of the housing to register a right click mouse function, based on the first orientation of the portion of the hand of the user on the surface of the housing; and
    reassigning a new second section of the housing to register the right click mouse function, based on the second orientation of the portion of the hand on the surface of the housing.

18. The method of claim 16, further comprising:
detecting a tilt of the input device; and
triggering a scroll signal based on the tilt of the input device.

19. The method of claim 16, wherein the sensor is a touch sensor.

20. The method of claim 19, wherein the sensor is an optical sensor.

* * * * *